United States Patent
Kim-Habermehl et al.

(10) Patent No.: US 9,212,280 B2
(45) Date of Patent: Dec. 15, 2015

(54) REDISPERSIBLE POLYMER POWDER MIXTURES FOR USE IN DRY-MIX FORMULATIONS

(71) Applicants: Dow Global Technologies LLC, Midland, MI (US); Rohm and Haas Company, Philadelphia, PA (US)

(72) Inventors: Linda Kim-Habermehl, Midland, MI (US); Mark D. Westmeyer, Collegeville, PA (US); Liang Chen, Midland, MI (US); Liang Hong, Schwenksville, PA (US); Mladen Ladika, Midland, MI (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/431,454

(22) PCT Filed: Sep. 13, 2013

(86) PCT No.: PCT/US2013/059571
§ 371 (c)(1),
(2) Date: Mar. 26, 2015

(87) PCT Pub. No.: WO2014/052033
PCT Pub. Date: Apr. 3, 2014

(65) Prior Publication Data
US 2015/0247029 A1      Sep. 3, 2015

Related U.S. Application Data

(60) Provisional application No. 61/707,026, filed on Sep. 28, 2012.

(51) Int. Cl.
| | | |
|---|---|---|
| C08L 31/04 | (2006.01) | |
| C08L 25/08 | (2006.01) | |
| C04B 28/04 | (2006.01) | |
| C04B 28/06 | (2006.01) | |
| C04B 40/00 | (2006.01) | |
| C08L 23/08 | (2006.01) | |
| C04B 111/00 | (2006.01) | |
| C04B 111/70 | (2006.01) | |

(52) U.S. Cl.
CPC ............. *C08L 31/04* (2013.01); *C04B 28/04* (2013.01); *C04B 28/06* (2013.01); *C04B 40/0042* (2013.01); *C08L 23/0853* (2013.01); *C08L 23/0869* (2013.01); *C08L 25/08* (2013.01); *C04B 2111/00672* (2013.01); *C04B 2111/70* (2013.01)

(58) Field of Classification Search
CPC ......... C08L 31/04; C08L 28/08; C04B 28/04; C04B 28/06
See application file for complete search history.

(56) References Cited

U.S. PATENT DOCUMENTS

| | | | |
|---|---|---|---|
| 3,409,578 A | 11/1968 | Hwa | |
| 6,224,981 B1 * | 5/2001 | Richard et al. | C08F 291/00 427/212 |
| 6,451,900 B1 * | 9/2002 | Kuehn et al. | C08L 25/06 524/502 |

FOREIGN PATENT DOCUMENTS

| | | | |
|---|---|---|---|
| EP | 0 522 791 A1 * | 1/1993 | |
| EP | 0522791 A1 | 1/1993 | |
| EP | 2 399 955 A1 * | 12/2011 | |
| EP | 2399955 A1 | 12/2011 | |
| EP | 2433984 A1 | 3/2012 | |
| EP | 2 433 984 A1 * | 3/2015 | |

* cited by examiner

*Primary Examiner* — Robert Harlan
(74) *Attorney, Agent, or Firm* — Andrew E. C. Merriam

(57) ABSTRACT

A mixture of first and second redispersible polymer powders where the first redispersible polymer powder has a copolymer having a glass transition temperature of 60 degrees Celsius or higher and an acid level in a range of 0.1 to 8 weight-percent as determined by potentiometric titration according to ASTM D664 and the second redispersible polymer powder is selected from vinyl acetate ethylene copolymer redispersible polymer powders and polymer powders of a blend of vinyl acetate ethylene copolymer and vinyl ester of versatic acid copolymer is useful as a component in a dry-mix formulation that further contains Portland cement, alumina rich cement and calcium sulfate.

10 Claims, No Drawings

REDISPERSIBLE POLYMER POWDER MIXTURES FOR USE IN DRY-MIX FORMULATIONS

BACKGROUND OF THE INVENTION

1. Field of the Invention

The present invention relates to mixtures of redispersible polymer powders and dry-mix formulations of cement containing the redispersible polymer powders, in particular dry-mix formulations containing alumina rich cement.

2. Introduction

Dry-mix cement formulations (or simply "dry-mix formulations") are valuable for transporting and storing cement composition in a ready-to-mix and use state. Generally, preparation of a mortar from a dry-mix formulation merely requires addition of water. Dry-mix formulations often comprise redispersible polymer powder (RDP) additives to improve properties of a mortar prepared by mixing the dry-mix formulation with water. A common RDP additive used in dry-mix formulations are redispersible particles of vinyl acetate ethylene (VAE) copolymers and blends of VAE and vinyl ester of versatic acid (VeoVA) copolymers (VAE/VeoVA copolymers). These types of polymer additives are useful for enhancing working properties of the dry-mix as it is dispersed in water to form a mortar, in application of the mortar, and/or by increasing strength and flexibility of the resulting mortar by forming a polymer network within the resulting mortar.

Dry-mix formulations containing alumina rich cement are of particularly interest. Alumina-rich cement provides faster set times relative to Portland cements. Alumina-rich cement formulations are especially desirable for use in premium cement tile adhesives (CTA) and also in waterproofing membranes, grouts and self leveling underlayments. Alumina rich cement contains an alumina ($Al_2O_3$) content of greater than 30 weight-percent (wt %), preferably 40 wt % or more, more preferably 55 wt % or more and most preferably 70 wt % or more based on the total weight of the alumina rich cement.

It is a continuous desire in the industry of dry-mix formulations to improve mortar properties and enhance end-use performance of mortars. For example, it is desirably to have a longer quick open time in order to increase the working time of a mortar. It is also desirable to decrease the set time of a mortar to allow workers to move from application of a mortar during construction to subsequent stages in construction more quickly, which improves productivity. It is yet further desirable to decrease the required water load for a dry-mix formulation, which corresponds to how much water is required to achieve optimal mortar properties. It is also generally desirable to minimize colloidal stabilizer that accompanies RDP additives into a dry-mix formulation because colloidal stabilizers can interfere with the performance of the RDP in enhancing mortar properties.

At the same time, it is desirable to retain dry-mix formulations as close to current and well accepted formulations as possible. This is desirable to keep costs down and to avoid dramatically changing current industry practices, which can require extensive testing and qualifications to confirm industry standards are still met. For example, the current dominant RDP technology for dry-mix cement formulations is based on VAE and VAE/VeoVA copolymers. It is also desirable to achieve the benefits of alumina rich cement with lower concentrations of alumina rich cement.

BRIEF SUMMARY OF THE INVENTION

The present invention provides a mixture of redispersible polymer powders (RDPs) that are particularly useful in forming a dry-mix formulation that produces a mortar having one or more than one, and can offer all of the desired features set forth above. That is, the mixture of RDPs provide for a dry-mix formulation having one or more of the following improvements over a dry-mix formulation containing an RDP of only VAE or VAE/VeoVA copolymer: a mortar having a longer quick open time, a mortar having decreased set time, a dry-mixing having a lower required water load necessary for optimal properties, and a dry mix containing an RDP without colloidal stabilizer. Surprisingly, the dry-mix formulation of the present invention contains an RDP of copolymers selected from VAE and VAE/VeoVA in combination with another RDP as a drop in replacement for just VAE or VAE/VeoVA RDPs.

Surprisingly, an RDP mixture of a RDP with a particularly high glass transition temperature and carboxylation level and a RDP of VAE or a VAE/VeoVA copolymers, when included in a dry-mix formulation, results in a dry-mix that produces a mortar having one or more of the aforementioned desired improvements over a dry-mix containing an RDP of only VAE or VAE/VeoVA copolymers alone.

In a first aspect, the present invention is a mixture comprising first and second redispersible polymer powders, wherein: (a) the first redispersible polymer powder comprises polymer particles primarily comprising a copolymer having a glass transition temperature of 60 degrees Celsius or higher and an acid level in a range of 0.1 to 8 weight-percent percent as determined by potentiometric titration according to ASTM D664; and (b) the second redispersible polymer powder is selected from vinyl acetate ethylene copolymer redispersible polymer powders and polymer powders of a blend of vinyl acetate ethylene copolymer and vinyl ester of versatic acid copolymer. The mixture can be in the form of a dry-mix formulation that further comprises Portland cement, alumina rich cement and calcium sulfate.

The mixture of the present invention is useful for preparing mortars that are useful, for example, as cement tile adhesives, grout, waterproofing membranes, crack isolation membranes, repair mortars, and self leveling underlayments.

DETAILED DESCRIPTION OF THE INVENTION

"ASTM" refers to ASTM International and is used to designate a test method by number as published by ASTM. "ANSI" refers to American National Standards Institute. "ISO" refers to International Organization for Standardization and is used to identify ISO test method numbers. Test numbers refer to the most recent test published prior to the priority date of this document unless otherwise specified by a date (for example, using a hyphenated suffix after the test number). "Multiple" means two or more. "And/or" means "and, or as an alternative". All ranges include endpoints unless otherwise indicated. Specification of a "C" with a numeric subscript when identifying organic compounds refers to the number carbon atoms in the organic compound. "Polymer" includes both homopolymer and copolymer. Redispersible polymer powder, or RDP, refers to a polymer powder that can be dispersed into deionized water, desirable to such an extent that the particles fully disperse rather than agglomerate to form particles equivalent to the size of particles in the dispersion used to prepare the RDP.

The present invention comprises a first RDP that comprises polymer particle primarily comprising a copolymer having a glass transition temperature (Tg) of 60 degrees Celsius (° C.) or higher, preferably 80° C. or higher and more preferably 100° C. or higher. There is no technical upper limit known for the Tg of the first redispersible polymer powder primary copolymer. However, it is typical for the copolymer to have a Tg of 200° C. or lower. Determine Tg for a copolymer by preparing the copolymer alone and measuring the Tg of that copolymer. Measure Tg of a polymer according to ASTM D7426-08 using a heating and cooling rate of 10° C. per minute.

The first RDP "primarily" comprises the copolymer with the aforementioned Tg (that is, "high Tg copolymer"). That means, over 50 weight-percent (wt %), preferably 60 wt % or more, more preferably 70 wt % or more, still more preferably 80 wt % or more, yet more preferably 90 wt % or more and conceivably 100 wt % of the polymers in the first redispersible polymer powder is the high Tg copolymer.

The high Tg copolymer of the first RDP has an acid level (also known as "carboxylation level" or amount of carboxylation) of 0.1 wt % or more, preferably 0.5 wt % or more and at the same time 8 wt % or less, preferably 5 wt % or less and more preferably 3 wt % or less and still more preferably 1.5 wt % or less. Acid level refers to the percent by weight of carboxylic acid moieties copolymerized into the copolymer relative to total weight of monomers copolymerized to form the copolymer. Determine acid level by potentiometric titration according to ASTM D664. Swell the particles with a solvent and neutralize all acid groups present with a strong base (such as sodium hydroxide). Then titrate the particles using the potentiometric titration method.

Introduce carboxylic acid moieties into the high Tg copolymer by copolymerizing acid monomer and/or anhydride monomers into the copolymer. Suitable acid monomers in the high Tg copolymer include itaconic acid, acrylic acid, methacrylic acid, maleic acid. Suitable anhydride monomers include itaconic anhydride, acrylic anhydride, methacrylic anhydride and maleic anhydride. Desirably, the high Tg copolymer comprises copolymerized itaconic acid and can comprise itaconic acid as the only copolymerized acid monomer. Itaconic acid facilitates positioning of more acid functionalities on the surface of the particles than other acids.

The high Tg copolymer of the first redispersible polymer powder is desirably a styrenic copolymer. That is, the high Tg copolymer desirably contains copolymerized styrenic monomer. Desirably, the styrenic monomers are styrene. Preferably, the styrenic monomer is styrene. Desirably, the high Tg copolymer is a copolymer of styrene and a carboxylic acid monomer that preferably comprises or even consists of itaconic acid.

The high Tg copolymer of the first redispersible polymer powder can also, or alternatively, comprise acrylic monomers such as methylmethacrylate and/or tert-butyl methacrylate. For example, the high Tg copolymer can comprise both styrenic and acrylic monomers, styrenic monomers and no acrylic monomers or acrylic monomers and no styrenic monomers.

The ratio of monomers selected for the high Tg copolymer is such that the resulting copolymer has a Tg and acid level that falls within the aforementioned Tg and acid level.

The first RDP desirably has an average particle size in a range of 300 to 5,000 nanometers (nm). Desirably, the first RDP has an average particle size of 350 nm or more, preferably 400 nm or more and at the same time desirably 800 nm or less and preferably 500 nm or less. Determine average particle size of an RDP by dispersing the RDP in deionized water by adding 0.1 gram of the RDP to ten milliliters of water and vortex mixing for one minute and then determine average particle size by laser diffraction according to ISO13320-2009 using a Beckman Coulter LS 13 320 Series laser Diffraction Particle Size Analyzer. Unless otherwise stated, "average particle size" refers to volume-average particle size.

The first RDP can be prepared by first forming a dispersion of the polymer particles in an aqueous medium and then spray drying the dispersion to isolate the polymer particles as a RDP. Interestingly, and beneficially, the first RDP can be isolated by spray drying without including a colloidal stabilizer such as polyvinyl alcohol (PVOH) because the Tg is sufficiently high to preclude blocking and irreversible clumping of the polymer particles. Therefore, the first RDP can be free of colloidal stabilizer such as PVOH. Colloidal stabilizer can still be beneficial, however, for redispersing the RDP and so is generally present at a concentration of 0-30 wt %, preferably 0-5 wt % based on total weight of first RDP.

Second RDP is selected from vinyl acetate ethylene copolymer (VAE) RDPs and polymer powders of a blend of vinyl acetate ethylene copolymer and vinyl ester of versatic acid copolymer (VAE/VeoVA) RDPs. Preferably, the second RDP is selected from VAE RDPs.

The mixture of the present invention can be free of core-shell RDPs. Core-shell RDPs comprise a shell polymer around and associated with a core polymer. "Associated" means proximate to one another due to physical or chemical restraints. For example, the shell polymer can physical encompass the core polymer thereby being associated with the core polymer by a physical restraint. The shell polymer can also be bonded (for example, through graph copolymerization) to the core polymer thereby being associated through chemical restraints. The shell polymer is "around" the core polymer, which means it is located more proximate to the outside surface of the core-shell RDP particle than the core polymer. Desirably, the shell polymer is exposed on the outside surface of the core-shell RDP particle and generally surrounds the core polymer. The RDPs of the present invention typically comprise a single polymer.

The amount of first RDP is generally 10 wt % or more, preferably 20 wt % or more, still more preferably 25 wt % or more and can be 30 wt % or more based on total weight of first and second RDP in the mixture. At the same time, the concentration of first RDP is generally 60 wt % or less and preferably is 40 wt % or less, more preferably 30 wt % or less and can be 20 wt % or less based on total weight of first and second RDPs in the mixture.

The total amount of RDP present in the mixture is desirably two wt % or more, preferably 5 wt % or more and can be 10 wt % or more, 20 wt % or more, 30 wt % or more and even 40 wt % or more based on total mixture weight. At the same time, the total amount of RDP present is generally 50 wt % or less and can be 40 wt % or less, 30 wt % or less 20 wt % or less or even 10 wt % or less based on total mixture weight. When the mixture is a dry-mix tile adhesive formulation, the total amount of RDP is generally 2-10 wt % based on total mixture weight. When the mixture is a dry-mix cementitious water proofing membrane the total amount of RDP is generally 10-50 wt % of the total mixture weight.

The mixture of the present invention can further comprise a combination of both Portland cement and alumina rich cement to form a dry-mix cement formulation. The Portland cement is any ordinary Portland cement. The alumina rich cement has an alumina ($Al_2O_3$) content that is greater than 30 wt %, preferably 40 wt % or more, more preferably 55 wt % or more, still more preferably 70 wt % or more based on total alumina rich cement weight. The alumina rich cement can be, for example, selected from calcium aluminate cement (CAC) and calcium sulfoaluminate cement (CSA).

The amount of Portland cement in a dry-mix formulation form of the mixture of the present invention is desirably 25 wt % or more, and can be 30 wt % or more, even 40 wt % or more and at the same time is generally 45 wt % or less, preferably 40 wt % or less based on the total weight of the dry-mix formulation.

The amount of alumina rich cement is desirably 0.5 wt % or more, typically one wt % or more, preferably 2.5 wt % or more and at the same time typically 10 wt % or less desirably 8 wt % or less and preferably 5.5 wt % or less based on total weight of the dry dry-mix formulation form of the mixture of the present invention.

The dry-mix formulation form of the mixture of the present invention further comprises calcium sulfate, typically at a concentration of 40 wt % or more and 60 wt % or less based on total weight of alumina rich cement.

The mixture can, and generally does when the mixture is a dry-mix formulation, contain fillers and other conventional additives in conventional amounts, such as, for example, alkali metal hydroxide and/or alkaline earth metal hydroxide selected from the group consisting of zinc oxide, zinc hydroxide, and zinc hydroxide carbonate, an accelerator such as lithium carbonate, tartaric acid, one or more thickener such as a cellulose ether, such as hydroxymethylcellulose, a defoamer, and a liquefier, dispersant, or superplasticizer, such as a water soluble co-polymer dispersant, such as MELFLUX™ 2651F, a modified polycarboxylate (MELFLUX is a trademark of BASF Construction Polymers GMBH). Examples of fillers include, for example, sand such as silica sand and quartz sand, quartz flour, calcium carbonate, dolomite, aluminum silicates, talc or mica, or light weight fillers such as pumice, foamed glass, aerated concrete, perlites or vermiculites. Mixtures of the fillers may also be included.

The dry-mix formulation form of the mixture of the present invention of the present invention is useful for hydrating to form mortar. Hydrating the dry-mix formulation generally occurs by adding water to the dry-mix formulation while mixing. One of the advantages of the present dry-mix formulation over other dry-mix formulations (particularly those containing only RDPs selected from RDPs of VAE and VAE/VeoVA copolymers) is that it has a lower water load. That is, the present dry-mix formulation requires less water to simultaneously achieve optimal consistency, compressibility and shear properties (collectively, "Optimal Properties") than other dry-mix formulations. "Optimal Properties" in this context refers to optimal values for three characteristics, the test methods follow: consistency (97.5% rating value under Heritage-Wolff Stick Test), compressibility (>90% wetting in Compressibility Test) and viscosity (400,000-600,000 centiPoise in Mortar Viscosity Test).

Heritage-Wolff Stick Test

Place 100 grams of the dry-mix into a plastic container and add a known amount of water to form a mortar (approximately 20 grams). Evenly sir the mortar for 30 seconds with a wooden stick (tongue depressor). Evaluate the consistency of the mortar by placing the entire mortar composition on the top of the wooden stick while holding the stick in a horizontal position. Evaluate consistency by characterizing how the mortar moves or sags on the stick according to the following characterization scale: 100%=no movement; 97.5%=nearly compact with slight movement; 95%=slight and continuous movement; 92.5%=fast and continuous movement.

Compressibility Test

Prepare a uniform mortar by adding a known amount of water to the dry-mix while mixing. Trowel the mortar uniformly along the length of an acrylic tile. Allow the mortar to sit for 10 minutes. Place a glass plate on top of the mortar and apply a 2.2 kilogram weight immediately onto the glass plate and allow to sit for 30 seconds. Remove the weight and place a plastic sheet over the glass place, the plastic sheet having marked on it a 10.16 centimeter by 10.16 centimeter (4 inch by 4 inch) grid divided into 400 equally sized squares. Determine the percentage of the glass that is wetted by the mortar. Wetting of more than 90% of the glass is optimal.

Mortar Viscosity Test

Prepare a uniform mortar by adding a known amount of water to the dry-mix while mixing. Measure the viscosity of the mortar with a Brookfield Synchro-letric viscometer (Model RVT) in combination with a Brookfield Helipath stand at 25 degrees Celsius (° C.) using spindle T-F. To measure viscosity, place the mortar in a density cup and position it so that the spindle just touches the surface of the mortar. Allow the spindle to rotate for two minutes at five revolutions-per-minute (rpm). As the spindle rotates move the viscometer up and down so that the rotating spindle establishes a helical path through the sample. Take the first viscosity measurement after the spindle has submerged after completing a full revolution. Record four viscosity measurements as the viscometer moves in each direction and record the average of the measurements. Make viscosity measurement immediately after forming the mortar. A viscosity in a range of 400,000 to 600,000 centiPoise (cps) is optimal.

Another benefit of the present invention is that it provides for hydration to a mortar that concomitantly has Optimal Properties and longer quick open time, decreased set time, or both longer quick open time and decreased set time relative to other dry-mix formulations, particularly those containing RDPs selected only from RDPs of VAE and VAE/VeoVA copolymers.

Determine set time according to ASTM C191 by placing mortar formed by mixing a known amount of water with the dry-mix to form a uniform composition having optimal properties into circular set time molds and covering the mortar with a layer of plastic held in place with rubber bands. Characterize initial set time and final set time by measuring the distance Vicat needles can penetrate into the mortar.

Determine quick open time according to the following procedure: Put 100 grams of dry-mix into a 200 milliliter beaker, add water as noted for the specific mortar, stir for one minute, allow the mortar to set for three minutes, mix for another minute, butter the mortar onto a fiber-reinforced cement board (EtaplanN, 40 centimeters by 20 centimeters), comb the mortar at a 60° angle using a 4×4 millimeter notched trowel. At each of the following time intervals after trowling place an Earthenware tile (5 cm×5 cm, having a water absorbing capacity of 15+/−3% in accordance with EN 159) into the mortar and place a 3 kilogram weight on it for 30 seconds: 5 minutes, 10, minutes, 15 minutes, 20 minutes, 25 minutes, 30 minutes. After 40 minutes, remove all tiles and turn them over to expose the surface that was in contact with the mortar. Evaluate how extensively the mortar wetted each tile by determining what percentage of the tile is covered by mortar. To assist in the determination, place a 10×10 grid of squares, each 25 square millimeters in size, over the tile and determine what percentage of tile in each square is covered with mortar. Round the surface area percentage to the nearest 5% value. Higher surface area percentages on tiles set into the mortar at a certain time reveals the mortar is more "open" that time than a tile having a lower surface area percentage from that same certain time.

These improvements in properties are evident even when the dry-mix formulation comprises less colloidal stabilizer and/or less alumina rich cement than other comparable dry-mix formulations. For example, these improvements can be evident even when the first RDP has 5 wt % or less colloidal stabilizer, even when the first RDP has no colloidal stabilizer.

The following examples illustrate embodiments of the present invention.

EXAMPLES

The following components are used to prepare the Examples (Exs) and Comparative Examples (Comp Exs):

| Component | Description |
| --- | --- |
| 450 SPP | A redispersible polymer powder of a copolymer consisting of 99 wt % styrene and one wt % itaconic acid that has an average particle size of 450 nanometers. (prepared as described below). |
| 225 SPP | A redispersible polymer powder of a copolymer consisting of 98 wt % styrene and two wt % itaconic acid that has an average particle size of 225 nanometers. (prepared as described below). |
| VAE RDP | A redispersible polymer powder of a vinyl acetate-ethylene copolymer having a residual moisture content of 2 wt % or less, bulk density of 0.375-0.525 grams per milliliter and a glass transition temperature of approximately 17° C. (for example DLP 2000 redispersible polymer powder available from The Dow Chemical Company). |
| Portland Cement | Portland Cement Type 1 |
| Alumina Rich Cement | A calcium aluminate cement containing 68.7-70.5 wt % alumina (for example, TERNAL ™ W calcium aluminate cement; TERNAL is a trademark of Kerneos Corporation). |
| Calcium Sulfate | At least 98.7 wt % calcium sulfate composition (for example, SNOW WHITE ™ calcium sulfate filler; SNOW WHITE is a trademark of United States Gypsum Company) |
| Cellulose Ether | Hydroxyethyl methyl cellulose having as a 2 wt % solution in water, a neutral pH and a viscosity of 40,000-60,000 milliPascals * seconds according to Haake Rotovisko RV 100, shear rate 2.55 s$^{-1}$ at 20° C. (for example, WALOCEL ™ MKX 60000 PF 01 hydroxyethyl methyl cellulose; WALOCEL is a trademark of the Dow Chemical Company). |
| Sand | Silica sand (for example, unground silica sand sold as F-80 by U.S. Silica). |

Preparation of 450 SPP RDP

Into a 4-neck, 5-liter round bottom flask add 785 grams of deionized water, a reactor buffer (solution of 1.2 grams of sodium carbonate in 30 grams deionized water) and 23.3 grams of itaconic acid. Fit the 5-liter round bottom flask with a mechanical stirrer, thermocouple, condenser and a stainless steel dip tube. Warm the solution in the round bottom flask to 95° C. while mixing at 125 revolutions per minute. Add quickly (within one minute) to the 95° C. solution a preformed seed solution. The preformed seed solution is 56.6 grams of an acrylic latex having a particle size of 103 (for example, RHOPLEX™ AC-2612 acrylic emulsion, RHOPLEX is a trademark of The Dow Chemical Company) and 30 grams deionized water. Then feed into the solution a monomer emulsion at a rate of 11.7 grams per minute using and FMI Q pump and a cofeed catalyst at 0.76 grams per minute using a Cole-Palmer Dual syringe pump. The monomer emulsion contains 490 grams of deionized water, 11.9 grams of alkyldiphenyloxide disulfonate (DOWFAX™ 2A1 Surfactant, DOWFAX is a trademark of The Dow Chemical Company), and 2308.4 grams of styrene. The cofeed catalyst contains 7.6 grams of sodium persulfate in 220 grams of deionized water. The addition of the monomer emulsion takes four hours and cofeed catalyst takes five hours. After the additions are complete, rinse the monomer emulsion line into the solution with 35 grams deionized water and the cofeed catalyst line into the solution with 10 grams of deionized water. Maintain the solution temperature at 87-89° C. during addition of the monomer emulsion and cofeed catalyst and continuously stirred at 225 revolutions per minute.

Cool the resulting emulsion to 80° C. and then rapidly add an aqueous solution of 0.13 grams of ferrous sulfate in 38 grams of deionized water. Then over 30 minutes feed 65 grams of a 1.2 wt % tert-butylhydroperoxide solution and a 65 grams of a 2.6 wt % sodium formaldehyde sulfoxylate solution using a dual syringe pump while cooling to 50° C. Then add 34 grams of an aqueous 25 wt % sodium hydroxide solution over ten minutes. Isolate the latex. The resulting latex is 55.42 wt % solids, has an average particle size of 458 nanometers (BI90 plus), a viscosity of 53 centipoise (LV#2, 60 rpm), a pH of 7.94 and 1614 ppm styrene.

To obtain the RDP, spray dry the resulting latex using a two-fluid nozzle atomizer equipped on a MOBILE MINOR™ 2000 Model H spray dryer (MOBILE MINOR is a trademark of NIRO A/S Limited Liability Company, Denmark). Use an air pressure to the nozzle of 1 bar with 50% flow equivalent to 6.0 kilograms per hour of air flow. Spray dry in a nitrogen environment with an inlet temperature fixed at 140° C. and an outlet temperature targeted at 50° C. by tuning the feed rate of the dispersion (feed rate of 20-30 milliliters per minute). Prior to spraying, adjust the pH of the latex to approximately 10 using 1 M sodium hydroxide solution. Mix the latex with a MOWIOL™ 488 PVOH solution (MOWIOL is a trademark of Hoechst Aktiengesellschaft) to a concentration of 5 wt % based on latex solids weight. Pump the mixture into the heated chamber by an emulsion feed pump while feeding Kaolin clay powder (Kamin™ HG-90, Kamin is a trademark of Kamin LLC) into the chamber as an anti-caking agent at a concentration of approximately 10 wt % of the solids weight in the emulsion.

The resulting RDP has an average particle size of 10-20 microns as determined using a Beckman Coulter LS 13 320 laser diffraction particle size analyzer equipped with a Tornado Dry Powder System. The RDP redisperses to the latex particle size in water as determined by dispersing the RDP into deionized water at a concentration of one wt %, vortex mixing for 30 seconds two times and then determining particle size with a Beckman Coulter LS 13 320 laser light diffraction particle size analyzer equipped with the Universal Liquid Module. The method used is the international standard ISO 13320-1:1999 Particle Size Analysis-Laser Diffraction Method.

Preparation of 225 SPP RDP

Prepare the 225 SPP RDP in like manner as the 450 SPP RDP except use 113.2 grams of perform seed instead of 59.6 grams.

Comp Ex A and Exs 1-3

Ex and Comp Ex mixtures, both RDP mixtures and full dry-mix forms of the mixtures containing the RDP mixtures, are described in Table 1 followed by characteristics of the dry-mix and resulting mortar at the specified Water Load. Concentrations are provided in wt % relative to total weight of the dry-mix. Prepare the dry-mixes of the Exs and Comp Exs by combining the cement, sand, lithium carbonate, tartaric acid, calcium sulfate and RDP components together in a plastic bag and hand mixing for two minutes followed by conditioning (let sit to equilibrate) for 24 hours.

For characterizing the mortar, hydrate with the amount minimum amount of water required to achieve Optimal Properties as described for the Water Load test and then follow the procedures for each of the characterization tests.

TABLE 1

|  | Comp Ex A | Ex 1 | Ex 2 | Ex 3 |
|---|---|---|---|---|
| Portland Cement | 31 | 31 | 31 | 31 |
| Calcium Rich Cement | 4.00 | 4.00 | 4.00 | 4.00 |
| Sand | 56.38 | 56.38 | 56.38 | 56.38 |
| Lithium Carbonate | 0.1 | 0.1 | 0.1 | 0.1 |
| Tartaric Acid | 0.2 | 0.2 | 0.2 | 0.2 |
| Calcium Sulfate | 2 | 2 | 2 | 2 |
| VAE RDP | 6 | 5.10 | 5.10 | 4.2 |
| 225 SPP | 0 | 0.9 | 0 | 0 |
| 450 SPP | 0 | 0 | 0.9 | 1.8 |
| Cellulose Ether | 0.32 | 0.32 | 0.32 | 0.32 |
| Water Load[1] | 0.215 | 0.200 | 0.200 | 0.200 |
| Mortar Viscosity[2] (cps) | 511,000 | 600,000 | 592,000 | 524,000 |
| Set Time (hours - initial/final) | 10.7/24.5 | 8.8/30.5 | 10.8/20.6 | 6.8/12.7 |
| Quick Open Time (% tile coverage) |  |  |  |  |
| 5 min | 97 | 97 | 97 | 98 |
| 10 min | 93 | 80 | 90 | 85 |
| 15 min | 90 | 55 | 90 | 81 |
| 20 min | 50 | 50 | 50 | 50 |
| 25 min | 35 | 43 | 45 | 45 |
| 30 min | 12 | 20 | 40 | 40 |
| Total colloidal stabilizer[3] (wt % relative to total RDP weight) | 11 | 9.95 | 9.95 | 8.9 |

[1]Water Load corresponds to the lowest weight ratio of water to dry-mix determined to provide Optimal Properties (optimal consistency, compressibility and viscosity as describe earlier herein) for the resulting mortar.
[2]Mortar viscosity as determined by the Mortar Viscosity Test described earlier herein. Values are in thousands of cps. For example, 490k cps = 490,000 cps.
[3]Colloidal stabilizer is PVOH. DLP2000 contains approximately 11 wt % PVOH based on total RDP weight. 450 SPP and 225 SPP each contain approximately 4 wt % PVOH based on total RDP weight.

Comp Ex A is a reference standard for Exs 1-3 and represents a dry-mix comprising only a VAE RDP. The Exs are a similar dry-mix formulation but with a certain portion of the RDP comprising a high Tg copolymer RDP. The Exs and Comp Exs described in Table 1 reveal the surprising and desirable benefit of the present invention. The data in Table 1 reveals at least the following:

1. A lower Water Load is required for the dry-mix formulations comprising a high Tg copolymer RDP. Comp Ex A requires a weight ratio of 0.215 while the Exs require a weight ratio of only 0.200.
2. Initial and final set times are shortened with an RDP that comprises a high Tg copolymer RDP. This is most evident in Ex 3, which illustrates a reduction of both initial and final set times relative to Comp Ex A. Both Exs 1 and 2 also reveal a shorter set time either in initial or final set time relative to Comp Ex A.
3. Quick open times are lengthened with an RDP that comprises a high Tg copolymer RDP. A higher percentage tile coverage corresponds to a longer quick open time. The advantage of the present invention is most evident in the 25 and 30 minute evaluation where 40% coverage of the tile is still achieved on tiles set into the mortar 30 minutes after trowling.
4. Improved performance with less colloidal stabilizer. The Examples display the aforementioned improvements while further comprising less colloidal stabilizer than the comparative example.

The invention claimed is:

1. A mixture comprising first and second redispersible polymer powders, wherein:
   a. the first redispersible polymer powder comprises polymer particles primarily comprising a copolymer having a glass transition temperature of 60 degrees Celsius or higher and an acid level in a range of 0.1 to 8 weight-percent percent as determined by potentiometric titration according to ASTM D664; and
   b. the second redispersible polymer powder is selected from vinyl acetate ethylene copolymer redispersible polymer powders and polymer powders of a blend of vinyl acetate ethylene copolymer and vinyl ester of versatic acid copolymer.

2. The mixture of claim 1 further comprising Portland cement, alumina rich cement and calcium sulfate so as to form a dry-mix formulation.

3. The mixture of claim 1, further characterized by the first redispersible polymer powder concentration being 10 weight-percent or more and 30 weight-percent or less based on total weight of first and second redispersible polymer powder.

4. The dry mixture claim 1, further characterized by the first redispersible polymer powder comprising primarily a copolymer containing copolymerized styrene and itaconic acid.

5. The mixture of claim 1, further characterized by the first redispersible polymer powder having an acid level in a range of 0.5 to 1.5 weight-percent as determined by potentiometric titration according to ASTM D664.

6. The mixture of claim 1, further characterized by the first redispersible polymer powder being free of colloidal stabilizer.

7. The mixture of claim 1, further characterized by the first redispersible polymer powder comprising particles primarily comprising a copolymer having a glass transition temperature of 80 degrees Celsius or higher.

8. The mixture of claim 1, further characterized by the first redispersible polymer powder having a volume-average particle size that is in a range of 350 to 800 nanometers.

9. The mixture of claim 1, wherein the second redispersible polymer powder is a vinyl acetate ethylene copolymer redispersible polymer powder.

10. The mixture of claim 1, further characterized by being free of core-shell redispersible polymer powder.

\* \* \* \* \*